US008127310B1

(12) United States Patent
Cook et al.

(10) Patent No.: US 8,127,310 B1
(45) Date of Patent: Feb. 28, 2012

(54) METHOD AND APPARATUS FOR DYNAMICALLY SWITCHING DISPLAY DRIVERS IN MOBILE DEVICE OPERATING SYSTEM

(75) Inventors: Colin N. B. Cook, Riverton, UT (US); Donald T. Saxby, Salt Lake City, UT (US); Douglas Boling, Saratoga, CA (US)

(73) Assignee: Celio Corporation, Salt Lake City, UT (US)

(*) Notice: Subject to any disclaimer, the term of this patent is extended or adjusted under 35 U.S.C. 154(b) by 1029 days.

(21) Appl. No.: 12/042,911

(22) Filed: Mar. 5, 2008

Related U.S. Application Data

(60) Provisional application No. 60/908,125, filed on Mar. 26, 2007.

(51) Int. Cl.
*G06F 15/163* (2006.01)

(52) U.S. Cl. ........................................ 719/327; 719/323

(58) Field of Classification Search .................. 719/321, 719/322, 333, 327, 323; 345/3.2, 3.3, 698
See application file for complete search history.

(56) References Cited

U.S. PATENT DOCUMENTS

| | | | | | |
|---|---|---|---|---|---|
| 5,964,843 | A * | 10/1999 | Eisler et al. | ................... | 719/323 |
| 6,289,396 | B1 * | 9/2001 | Keller et al. | .................. | 719/323 |
| 6,671,745 | B1 * | 12/2003 | Mathur et al. | ................ | 719/328 |
| 6,832,381 | B1 * | 12/2004 | Mathur et al. | ................ | 719/328 |
| 2006/0130072 | A1 * | 6/2006 | Rhoten et al. | ................. | 719/321 |
| 2007/0046562 | A1 * | 3/2007 | Polivy et al. | .................... | 345/1.2 |
| 2007/0101343 | A1 * | 5/2007 | Andrews et al. | .............. | 719/321 |
| 2007/0242061 | A1 * | 10/2007 | Rhoten et al. | ................. | 345/204 |
| 2007/0268296 | A1 * | 11/2007 | Ledebohm et al. | ........... | 345/501 |

* cited by examiner

*Primary Examiner* — H. S. Sough
*Assistant Examiner* — Brian Wathen
(74) *Attorney, Agent, or Firm* — Kilpatrick Townsend & Stockton LLP; Kenneth R. Allen

(57) ABSTRACT

A method and a system for dynamically switching, without initialization, display drivers of a mobile telephone or personal digital assistant having a processing unit operative with a mobile device operating system, wherein a display driver interface manager is embedded with the operating system that is operative to receive captured video application program interface messages, which redirects values of the video API messages to an alternative video driver, enabling a remote video display device to display a reconstructed image based on the video API messages. The ability to dynamically switch from a primary display to a secondary display is desirable to prevent disruptions in display content, including current display view.

7 Claims, 7 Drawing Sheets

METHOD AND APPARATUS FOR DYNAMICALLY SWITCHING DISPLAY DRIVERS IN MOBILE DEVICE OPERATING SYSTEM

CROSS-REFERENCES TO RELATED APPLICATIONS

See application data sheet

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable (or see appendix)

BACKGROUND OF THE INVENTION

This invention relates primarily to technology for providing an alternative visual interface of an intelligent mobile telephone, a smart phone, a personal digital assistant (PDA) or like device having a display, a processor, and a mobile device operating system with a graphical interface that in the present invention can be interdicted. An example is the Microsoft Windows Mobile operating system used in cellular telephones and PDAs having a processing unit capable of supporting the operating system. Smart phones herein encompass hand-held small mobile computers with some telecommunication capability and that are functional as telephones and that have primary constraints on size, weight and portability. Such constraints, as a consequence, impose constraints on power, display resolution and data entry capabilities, as compared with portable laptop computers, desktop computers and the like. For the purposes of this invention, there is no distinction to be drawn between smart phones and handheld personal digital assistants, so hereinafter the terms may be used interchangeably.

Smart phones are becoming a primary personal data assistant, since they can provide a host of functions integrated into a single handheld, pocket-sized computer unit, including telephone, email, messaging, internet access, calendar, calculator, task managers, word processor, still and video camera, clock and alarm clock, as well as an audio and video entertainment center, game console, GPS, and a host of other computer-based functions. A smart phone can even serve as a flashlight. However, the major strength of the smart phone—its extreme portability—is also a major weakness. Because of its inherent small size, the smart phone is not able to provide a display or a fully functional keyboard and pointing device useable for office applications such as word processing, spreadsheet programs, email clients, etc. These constraints limit the potential versatility of the smart phone.

A class of hardware and software products exist to address the so-called KVM (keyboard-video-mouse) interface problem. Unlike a conventional KVM application wherein a fixed asset is made accessible at a remote location, this invention relates to enhancing limited capabilities of a typical mobile asset in a local environment. Extended keyboards have been developed for selected personal digital assistants (PDAs). Software has been developed to extract data from smart phones for use on the mobile or desktop computers. Hot sync capability provides backup but does not necessarily provide a complete mirror of the content of mobile device. Screen copier programs copy phone display images to desktop computer screens, but do not enhance phone display resolution.

Display technology has also been developed that allows multiple display drivers to co-exist on certain smart phones and to allow smart phones to connect and drive larger displays. An example is described in the documentation of the tools known as Microsoft CE SDK, in which the concept of a secondary driver is defined as a co-resident auxiliary driver that is known to the operating system when installed. In one such method, a conventional secondary display driver is installed in the operating system to create larger resolution displays for use with a connected projection system. In this scheme, applications that wish to take advantage of the secondary driver must have specialized knowledge related to the secondary display driver and be written specifically for use with the secondary display driver. Other applications such as word processors, spreadsheets, email clients, and presentation applications which are written to interact with the default primary display driver and have no specific knowledge related to the secondary display driver are unable to take advantage of the features of the secondary driver. In another prior art method, the original display driver is replaced with a new display driver with enhanced capabilities. An alternate display driver is connected to the operating system's graphical display subsystem in an identical fashion to the original display driver with the desirable effect that applications written for the default primary display driver will be able to display their information in a larger format without modification or special knowledge. The significant disadvantage of this method is that when the user wishes to switch from the original to the alternate display driver or vice versa, a series of installation or re-installation steps, including a complete system re-initialization (re-boot), must be executed. These steps, which include closing and restarting applications, services, and device drivers, are inconvenient, time consuming and prone to error.

One technique that has been developed to overcome the re-initializing requirement is the so-called screen scraping technique. According to this technique, an application is installed that gains access to the primary display driver display buffer and periodically copies its content to a network protocol for remote viewing. One disadvantage is that the display resolution remains unchanged. Another disadvantage is that this technique is noticeably slow to execute. Still another disadvantage is that periodic sampling may result in missing content. This process is inefficient and can leave an unsatisfactory visual impression and noticeably slow display of images, particularly video images. In another method, the default primary display driver is replaced with another display driver that typically has a higher resolution while remaining connected to the original, lower resolution display device. Thus, even though applications may present a larger image to the alternate display driver, only a selectable portion of the large image is visible to the user at any given moment.

What is needed is a technique to seamlessly provide an alternative video display for handheld smartphones or PDAs.

SUMMARY OF THE INVENTION

According to the invention, a method and a system are provided for dynamically switching, without a full system re-initialization, display drivers of a mobile telephone or personal digital assistant having a processing unit operative with a mobile device operating system, wherein a display driver interface manager is installed as the primary display driver that is used with the operating system to receive video application program interface messages, which redirects values of the video API messages to either the original display driver or an alternate display driver as selected by a switch control application, enabling either the original display driver having the original image resolution or an alternate display driver with an alternate image resolution to be activated respectively. Furthermore, the display driver interface manager is installed in such a way as to hide the existence of the original and alternate display drivers from the knowledge of the operating system so that the operating system assumes that it is interacting with a single primary display driver according to the standard, default interface specifications of the operating system, with the result that the operating system and applications using the operating system are unaware of whether the original display driver or the alternate display driver is responding to its API messages at any given point in time. The ability to dynamically switch between an original display driver and an alternate display driver is desirable to avoid lengthy and inconvenient re-initialization and to prevent disruptions in display content, including current display view.

This invention is to be distinguished from desktop operating systems having complete primary and secondary display systems (with a dynamic switching component) integrated into an operating system. A key advantage of this invention is the ability to dynamically switch between existing original and alternate display drivers without knowledge of the inner workings of either display driver or disruption of the operating system. For the sake of simplicity only an embodiment involving an original and a single alternate case is explained. It is to be understood that the mechanisms are inheritably suitable to switching between more than two displays on a given system.

The invention will be better understood upon reference to the following detailed description in connection with the accompanying drawings.

DESCRIPTION OF SPECIFIC EMBODIMENTS OF THE INVENTION

The invention requires the experience of one skilled in the art of software engineering and who understands the terminology of display driver technologies as related to various operating systems and operating system standards.

Figure 1:
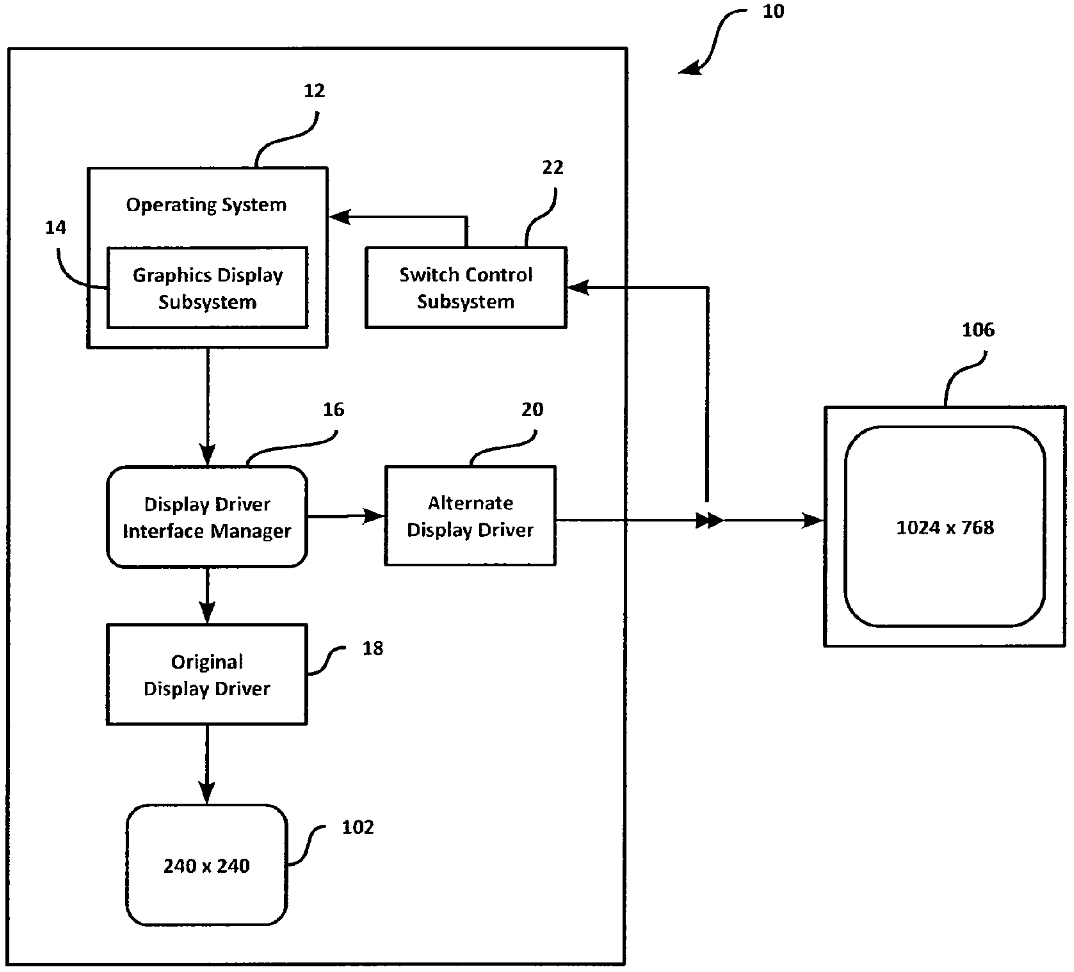
FIG. 1 is a functional block diagram of a mobile device with operating system, original display driver and small display modified with a display driver interface manager and switch control application according to the invention.

Referring to FIG. 1 there is shown a functional block diagram of a mobile device 10 with its mobile operating system 12 including a graphics display subsystem 14 and its original display driver 18 connected to an inherently small display 102 modified according to the invention to incorporate a custom display driver, herein a display driver interface manager 16, displacing the original display device driver and assuming the role of primary display driver, that can switch between an original display driver 18 and at least one alternate display driver 20 as herein after explained. Also according to the invention, there is shown an event monitoring application, herein a switch control subsystem 22, a system level element whose function is to control operation of the device driver interface manager 16 according to the state of the events which it is monitoring at its inputs as hereinafter explained.

The display driver interface manager 16 exploits the existing original primary display driver 18 and an alternate display driver 20 by loading them internal to its own operation in a manner that effectively hides their existence from the operating system 12 so that the operating system 12 is unaware that it is interacting with anything other than a single primary display driver (namely, the display driver interface manager 16), and then allowing calls (messages) sent from the operating system 12 to be passed on to either the original display driver 18 or to the alternate display driver 20, to be completed by the display driver interface manager 16, or to be modified by the display driver interface manager 16 to serve a particular purpose before being passed on to the loaded drivers.

Display driver routines that are called by the operating system 12 through the graphical display subsystem 14 are intended for a particular display driver. The intended display driver receives specific calls from the operating system in order to perform some operation required by the operating system. The majority of display calls from the operating system intended for the primary display driver are passed from the display driver interface manager 16 to either the loaded original display driver 18 or the alternate display driver 20, depending on the switching state.

The display driver interface manager 16 is responsible for duplicating display driver processes that are found in display drivers that the operating system 10 uses to communicate with a display driver 18 or 20. To the kernel of the operating system 10, the display driver interface manager 16 looks like a single display driver. Internally, the display driver interface manager 16 loads separate display drivers much as the operating system would. Depending on the state of a switch variable contained in the display driver interface manager 16 (which would contain information pertaining to the active display), the display driver interface manager 16 directs calls it receives from the operating system 10 to the display driver interface manager's 16 active display via the selected display driver 18, 20. The display driver interface manager 16 may translate some information in a particular display driver call so that it appears to be transparent to the operating system. In addition, the display driver interface manager 16 is also responsible for requesting information about any of its loaded drivers that might be required at a later time.

In some operating systems, such as Windows and Windows CE, a primary surface for a particular display driver is represented by a pointer to a location in memory. This pointer to memory is expected by the operating system to be fixed (i.e., it will not change). As this pointer value will have a different location for each of the display driver interface's loaded display drivers, it must be translated in order to be recognized by the operating system as it would if only a single display driver was being called. This is a further example of the transparency of the display driver interface manager 16 to the operating system. It is also an important feature of the invention when applied to a MS Windows/MS Windows CE environment.

Some mechanism is required to control which display driver 18, 20 considered by the display driver interface manager 16 to be active and to which the display driver interface manager 16 is passing calls from the operating system 12. According the invention, this mechanism is provided by the switch control subsystem 22 which can communicate with the display driver interface manager 16 through the intermediation of the operating system 12. The intention to switch between display drivers 18, 20 is represented to the switch control subsystem 22 as a set of external events or requests. In a particular embodiment, these events may correspond to the connection or disconnection of an external display device 106 as shown by way of illustration in FIG. 1. In other embodiments, the switch control subsystem may respond to other events such as those generated by programs, specific physical switch devices, or events generated automatically by timers and alarms. The combined state of events monitored by the switch control subsystem 22 determines when to effect a switch between display drivers 18, 20 and which display driver 18, 20 should become the selected display driver.

Figure 2:
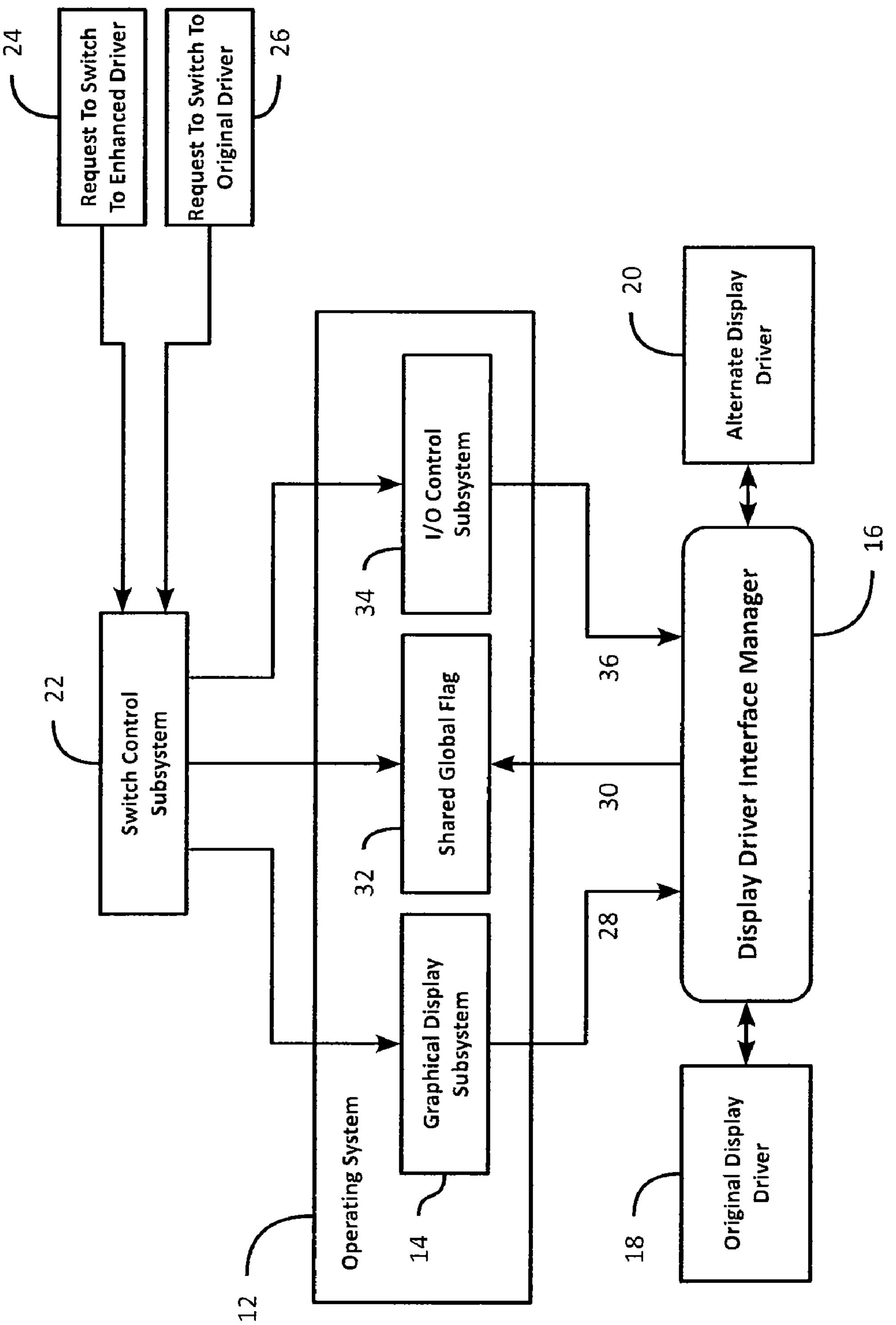
FIG. 2 is a block diagram illustrating the interaction between a switch control application and a display driver interface manager according to the invention.

FIG. 2 is a block diagram showing how a switch control subsystem 22 monitors events 24, 26 representing an intention to switch between display drivers 18, 20 and how it may communicate with and control the action of a display driver interface manager 16 through the facilities of an operating system 12 including but not limited to a graphics display subsystem 14, an I/O control subsystem 34, and a shared global flag 32. For example, in a Microsoft Windows CE embodiment, when a request 24 or 26 to change to either the alternate display driver 20 or to the original display driver 18 is detected by the switch control subsystem 22, it can use a graphical display subsystem 14 API message 28 which will be sent to and received by the display driver interface manager 16 as a signal to switch to either the alternate display driver 20 or the original display driver 18. It is not sufficient, however, for the switch control subsystem 22 to rely solely upon a graphical display API message 28 as a switch signal, since such an API message may also represent a legitimate command from another application and not a signal to switch display drivers. It is necessary for the switch control subsystem 22 to provide a separate but coordinated mechanism, in addition to the API message 28, for validating the API message as a signal to the display driver interface manager 16, which mechanism is provided by the state 30 (SET or RESET) of a shared global flag 32 accessible to both the switch control subsystem 22 and the display driver interface manager 16. Information 36 stored in the display drive interface manager 16 that may be needed by the switch control subsystem to complete a successful switch operation can be retrieved from the display driver interface manager through the I/O Control (IOCTL) mechanism 34 of the operating system 12.

Figure 5:
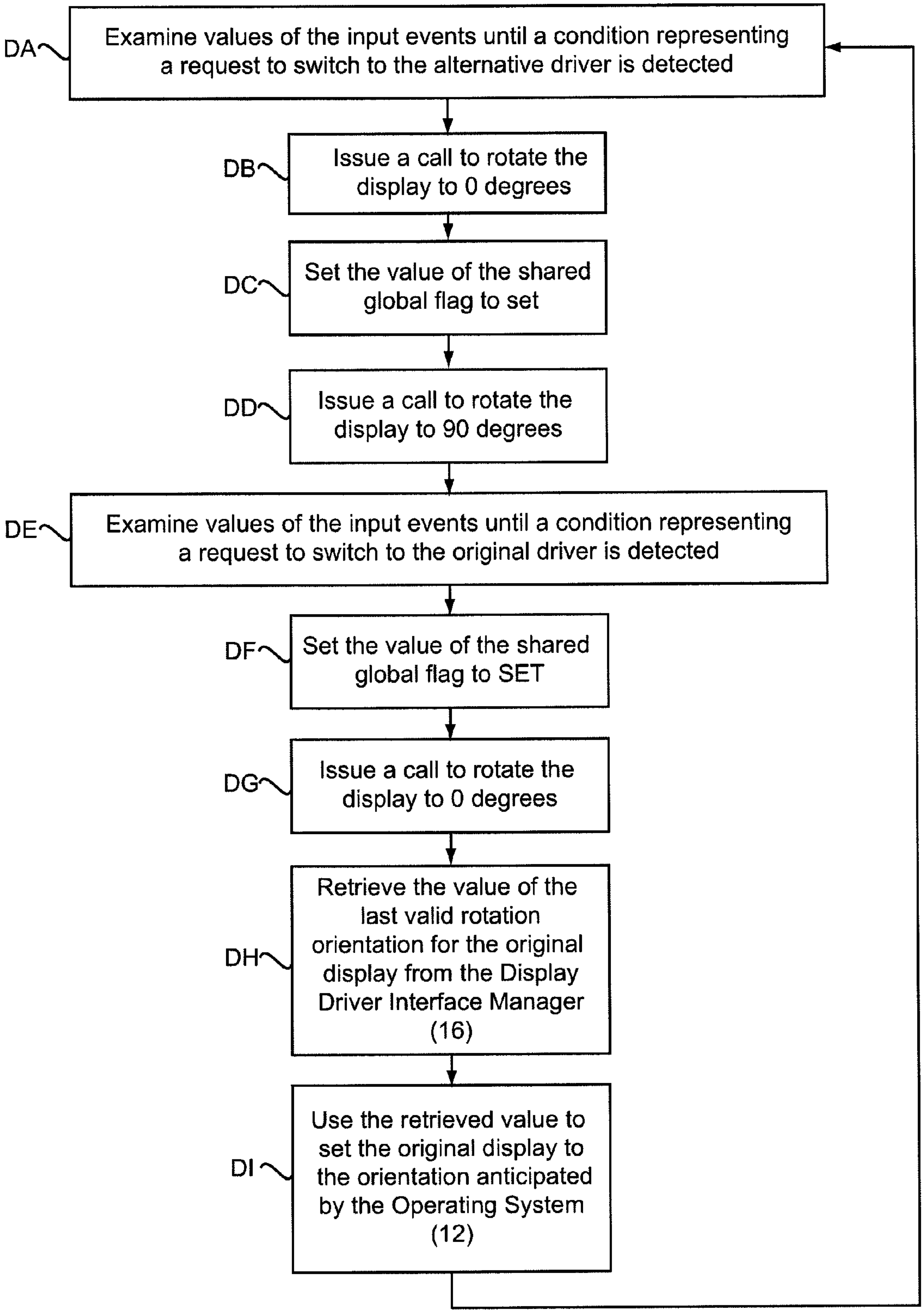
FIG. 5 is a flow chart of operation of one embodiment of a switch control application according to the invention.

When a pre-determined API message, such as a defined message in the case of a Microsoft Windows CE embodiment, is received by the display driver interface manager, it can then verify the API message 28 as having originated with the switch control application by checking the state 30 of the shared global flag 32 with a state value 30 of SET indicating a valid switch signal and a state value 30 of RESET indicating that the API message 28 did not originate with the switch control subsystem. The coordinated usage of both an API message and the state value of the shared global flag requires a specific sequence of events within the switch control application, as illustrated in FIG. 5 and described in subsequent paragraphs. In addition to the API messages and shared global flag, the switch control application can utilize I/O Control (IOCTL) messages 36 to access information within the display driver interface manager 16, which it can then use to facilitate or complete the display switch operation. For example, in a mobile device that supports screen rotation of the original display driver in response to user actions, the display driver interface manager may keep track of said user actions during the time that the alternate display driver is enabled and the original display driver is inactive and therefore not visible so that when a request 26 to switch back to the original driver is received, the switch control application 22 can complete the switch operation by using an IOCTL command 36 to receive from the display driver interface manager the current rotation state of the original display which it can then restore to match user expectations.

Figure 3:
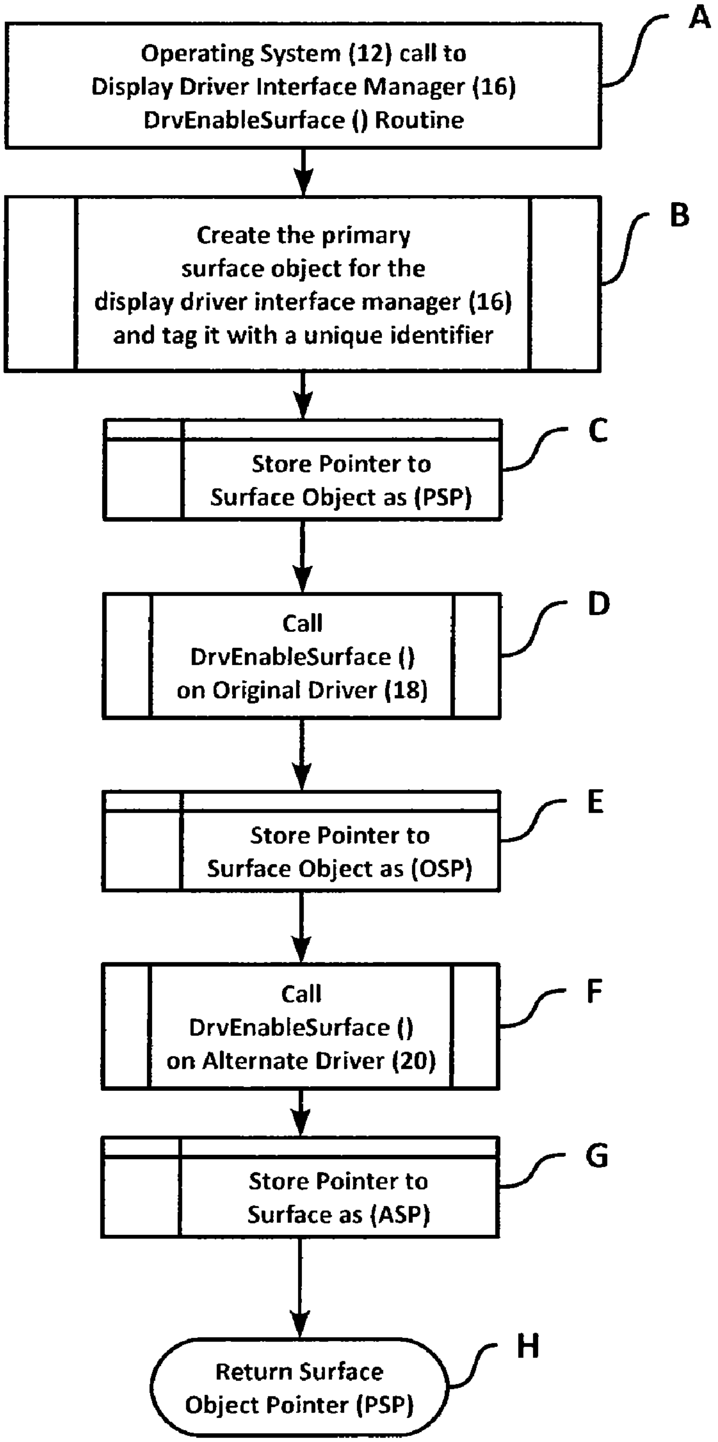
FIG. 3 is a flow chart of a display driver interface manager primary surface initialization for a specific embodiment of the invention.

FIG. 3 illustrates display driver interface manager initialization processes according to a Microsoft CE embodiment. A few points are to be considered. While translating surfaces in a MS Windows environment, the display driver interface manager 16 must keep track of a location in memory, herein a surface object pointer PSP specific to the instantiation of the driver, which surface object pointer is used by the operating system in subsequent calls to the display driver. It is important that the display driver interface manager 16 be able to uniquely identify its surface object pointer when it is receives it as an argument to subsequent calls from the operating system. This is accomplished by including a unique surface object type identifier or tag in the surface object information when the display driver interface manager creates its surface object and surface object pointer. The translation method defined herein uses the display driver interface manager-defined surface object type tag that is known by the display driver interface manager 16. The surface object type tag should be unique as to not interfere with surface types that are defined by the system.

When either display is selected, the operating system 12 may respond to various inputs indicating an intention to rotate the display that is not selected. It is desirable to note their occurrence by saving the latest rotation value in a variable local to the display driver interface manager 16, which saved value can be used to adjust the display to the anticipated rotation setting when the unselected display is re-selected.

In the example illustrated in FIG. 3, the surface initialization procedure according to a Microsoft Windows/CE embodiment is illustrated. For this particular embodiment, it is a characteristic of the invention that the display driver interface manager 16 always present an unchanging surface object pointer value to the operating system 12. The mechanism to accomplish this, explained hereafter, is enabled by first properly performing surface object initialization for the display driver interface manager and its loaded drivers as explained in this example. To begin the initialization, the operating system 12 issues a call to the DrvEnableSurface routine of the display driver interface manager 16 (Step A). This routine first creates the surface object and surface object pointer for the display driver interface manager 16, tagging it with a unique surface object type value (Step B), and stores the pointer as "(PSP)" (Step C). The routine then calls the DrvEnableSurface routine of the original display driver 18 (Step D) and stores its returned surface object pointer as "(OSP)" (Step E). The process is repeated in Steps F and G for the alternate display driver, with its return surface object pointer being stored as "(ASP)." Finally, the routine completes and returns the display driver interface manager's surface object pointer "(PSP)" to the operating system (Step H). In subsequent calls from the operating system 12 to the display driver interface manager 16 and which require the use of a surface object pointer, only the display driver interface manager's 16 surface object point "(PSP)" will be used in the communication between the operating system 12 and the display driver interface manager 16 regardless of whether the call was actually completed by the original display driver 18 or the alternate display driver 20. This is one mechanism by which the display driver interface manager 16 presents a single display driver presence to the operating system and effectively hides the existence of the original and alternate display drivers 18, 20.

In the descriptions that follow, an API message representing a command to rotate to 0 degrees is defined to be the API message corresponding to the operating system call ChangeDisplaySettingsEx with arguments DM_DISPLAYORIENTATION and DM__0, and also that an API message representing a command to rotate to 90 degrees is defined to be the API message corresponding to the operating system call ChangeDisplaySettingsEx with arguments DM_DISPLAYORIENTATION and DM__90.

The display driver interface manager 16 must provide rotation support in a Windows CE environment even if a particular loaded display driver does not provide support for screen rotation. As the display driver interface manager 16 is effectively the primary display driver, it must comply with screen rotation system requirements and handle screen rotation calls completely when they have been detected as "switch" events (from a switch control subsystem 22 mechanism as described previously) and will respond to the operating system 12 as supporting screen rotations, even if the original display driver 18 does not support rotations.

Note that various structures and objects created when one driver is selected may persist through a display driver switch operation and may need to be accessed and processed by the other display driver. In this embodiment, these structures and objects are represented by Microsoft Windows/CE GPE classes. In all implementations relevant to this invention, the original display driver conforms to the GPE class objects and structures. When the display driver interface manager 16, along with the alternate driver 20 also conform to the GPE specifications, then the objects and structures created and used by one display driver are compatible to be recognized and processed correctly by the other display driver. This uniform conformance to processing GPE objects and structures is a key factor in this embodiment contributing to this invention's capability to switch between original and alternate display drivers without corrupting or disturbing the visual displays.

Figure 4A:
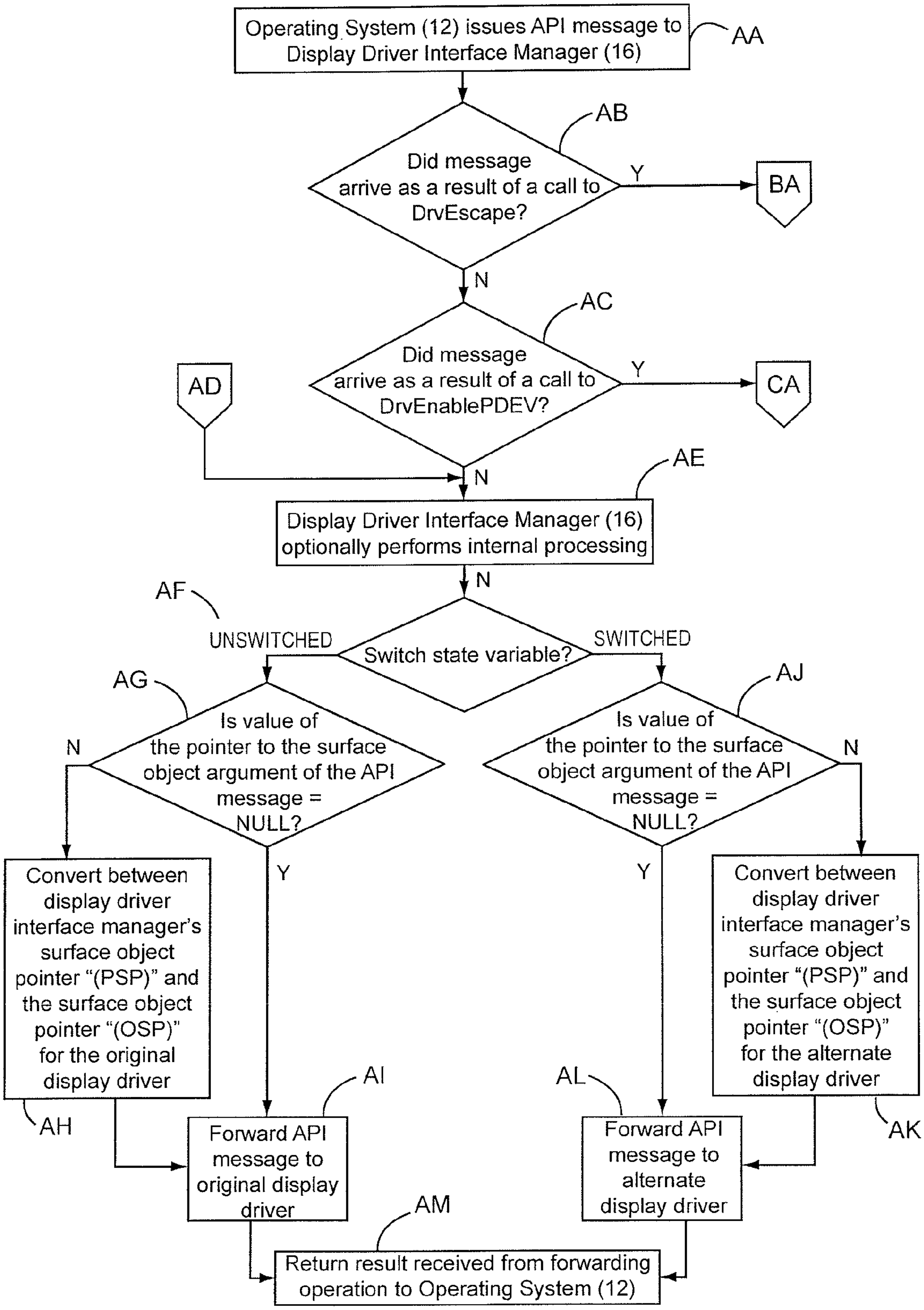
FIGS. 4A-4C are partial flow charts of a display driver interface manager operation for a specific embodiment of the invention.
Figure 4B:
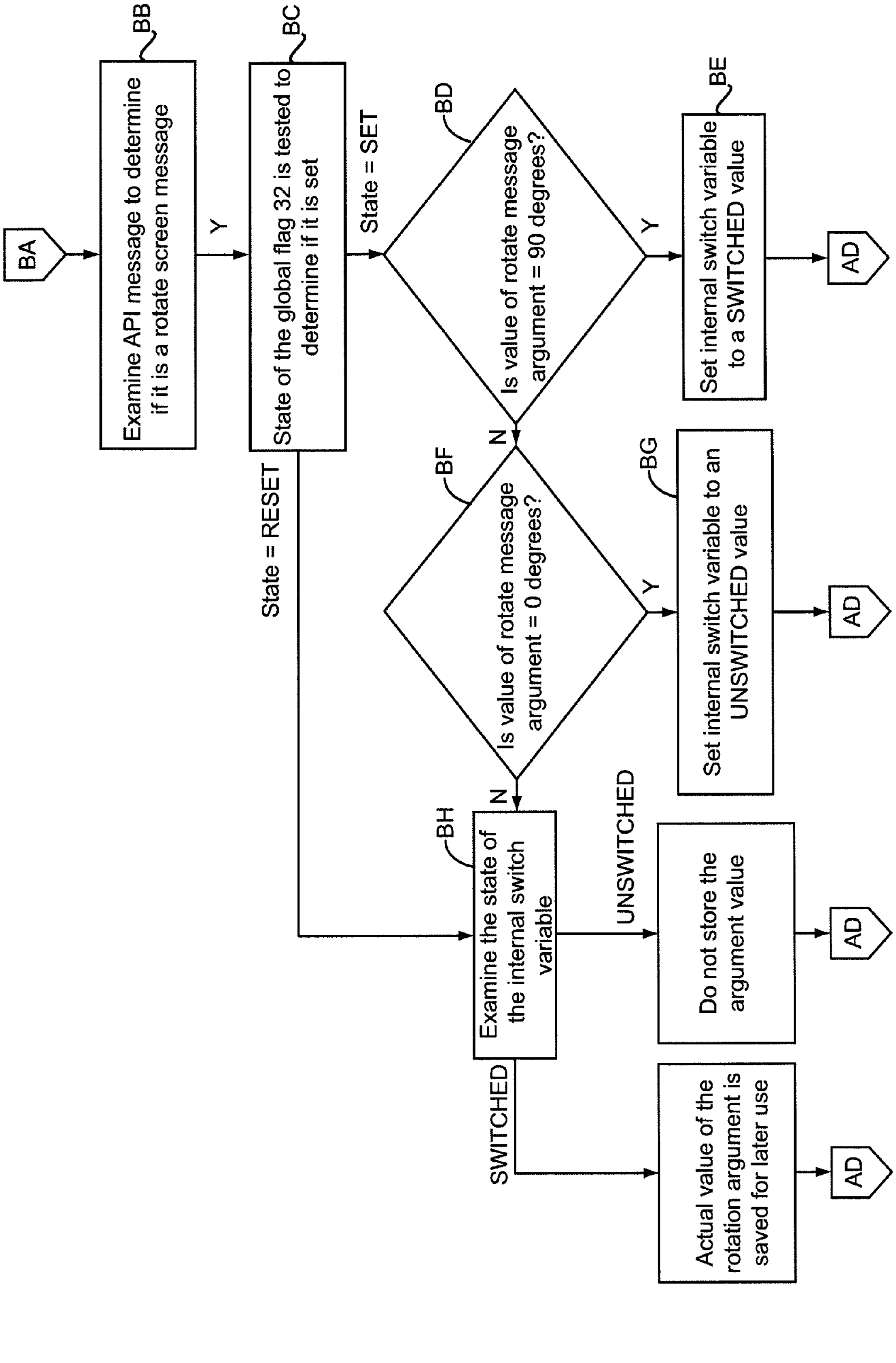
Figure 4C:
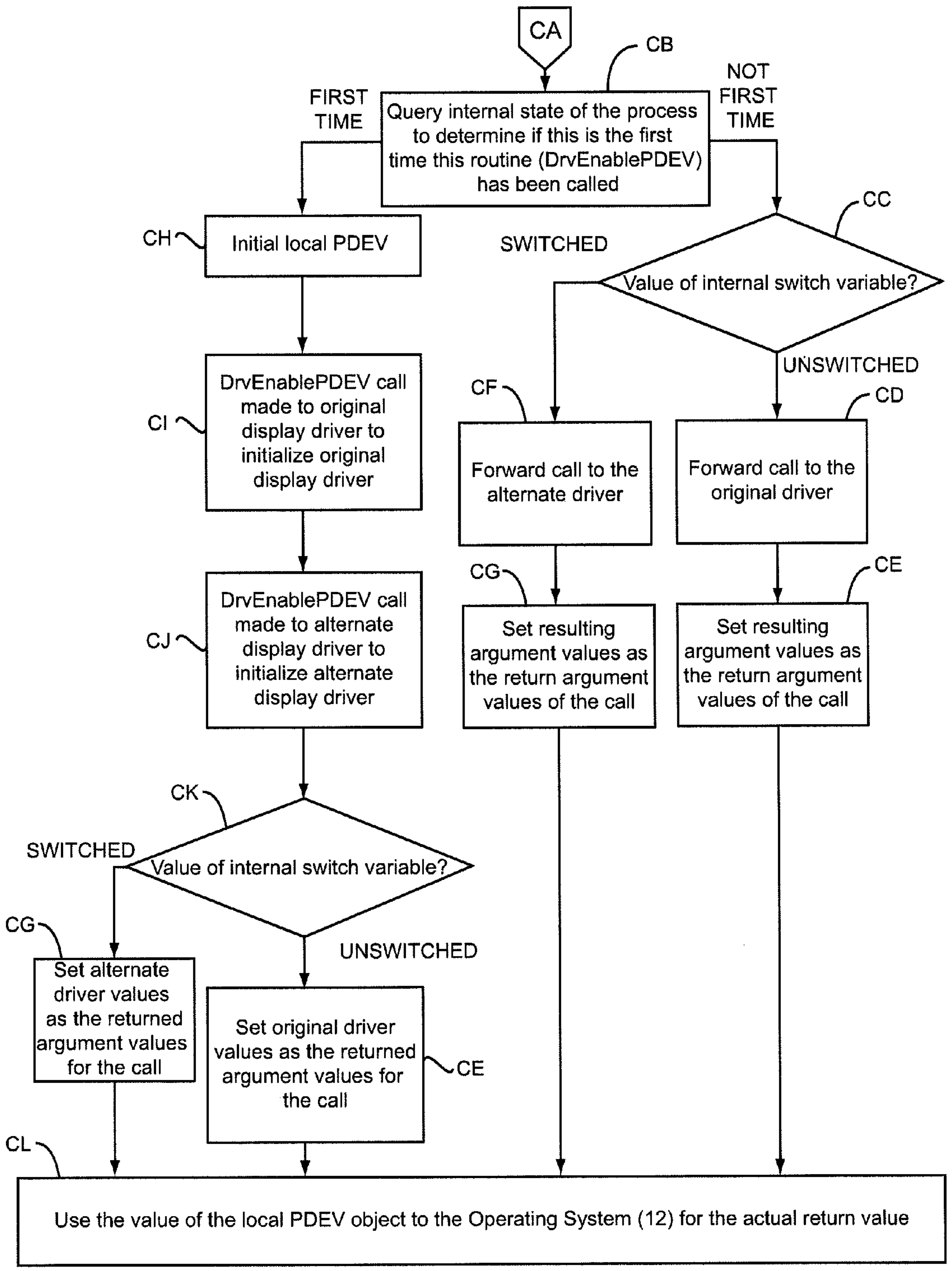

Referring to FIGS. 4A through 4C, the operation of the display driver interface manager 16 after initialization is explained. In a simplified sense, the display driver interface manager 16 processes API messages received from the operating system 12 in one of two ways: either as commands intended for normal operation of a display driver; or as a signal to switch between the original display driver 18 and the current alternate display driver 20. The former API messages are the result of the normal operation of the operating system 12 and its applications, while the later API messages are a result of the operation of the switch control subsystem 22. In general, API messages are passed from the operating system 12 to display drivers (of which the display driver interface manager 16 is one example) by making calls to a set of standard routines which valid display driver implementations are expected to provided. For the purpose of describing the operation of the display driver interface manager 16 in a Microsoft CE embodiment, two of these standard routines, DrvEscape and DrvEnablePDEV, may be considered separately while treating the remaining processes together as a whole requiring similar if not identical processing. As will be shown hereafter, calls made by the operating system 12 to the DrvEscape routine are used in a specific manner to effect the switch between original and alternate display drivers 18, 20.

Referring first to FIG. 4A, the processing for every API message begins with the operating system issuing the API message to the display driver interface manager (Step AA) by calling one of its supplied routines. If the message did not arrive as a result of a call to either DrvEscape or DrvEnablePDEV (Steps AB and AC), then the display driver interface manager 16 may optionally perform some internal processing (Step AE) before passing the message on to either the original or the alternate display driver. The determination of which driver to use is controlled by the current state of an internal switch variable. At any point in time, the switch state variable may take on only one of two values; either SWITCHED, indicating that the alternate display driver is currently selected, or UNSWITCHED, indicating that the original display driver is currently selected. If the switch state is UNSWITCHED (Step AF) indicating that the original display driver is currently selected, and if the value of the pointer to the surface object argument of the API message is not NULL as indicated by the result of the test at Step AG, then a conversion between the display driver interface manager's surface object pointer "(PSP)" and the surface object pointer "(OSP") for the original display driver is accomplished (Step AH). If the result of the test at Step AG indicates a NULL value for the surface object argument, a conversion is not required and the surface object pointer conversion process is skipped. The API message (possibly with its converted surface object pointer) is then forwarded to the original display driver (Step AI), and the result received from the forwarding operation is returned to the operating system 12 (Step AM).

Referring back to Steps AJ, AK, AL and AM) of FIG. 4A, if the state of the switch variable is determined to be SWITCHED indicating that the alternate display driver is currently selected, then operations (Steps AJ, AK, AL and AM) for the alternate display driver are performed analogous to those described for the original display driver (Steps AG, AH and AM).

Referring back to Step AB of FIG. 4A, if the API message is received as a result of a call to the display driver interface manager 16 DrvEscape routine, then processing continues as illustrated at point BA of FIG. 4B. Referring now to FIG. 4B, the API message is further examined to determine if it is a rotate screen message (Step BB). If it is, then the state 30 of the global flag 32 shared between the display driver interface manager 16 and the switch control subsystem 22 is tested (Step BC), and if the state 30 is SET, then the process has determined that this API message may represent a command to switch to either the original display driver or to the alternate display driver, as determined by the value of the rotate message argument. The argument is tested for a value of 90 degrees (Step BD) which if true causes the internal switch variable to be set to a SWITCHED value (Step BE). Referring again to Step BD, if the value of the argument is not 90 degrees, it is further tested (Step BF) for a value of 0 (zero) degrees, which if true causes the value of the internal switch variable to be set to an UNSWITCHED value (Step BG). Following a switch, either to the original or the alternate display driver, processing continues at point AD in FIG. 4A as previously described.

Referring again to Steps BC, BD and BF, if the state of the shared global flag is RESET, or if it is not and the rotation argument is neither 90 degrees nor 0 (zero) degrees, then the API message does not represent a command to switch displays and the process continues by examining the state of the internal switch variable (Step BH). If the state is SWITCHED, the actual value of the rotation argument is saved for later use as described hereafter. But if the state of the internal switch state is determined to be UNSWITCHED then the process does not store the argument value. In either case, processing continues at point AD of FIG. 4A. Referring again to Step BB, if the message is not a rotate screen command, processing for a potential display driver switch command as illustrated in this figure is bypassed and processing continues at point AD in FIG. 4A as previously described.

Referring back to Step AC of FIG. 4A, if the API message is a result of a call to the display driver interface manager 16 DrvEnablePDEV routine, processing continues at point CA of FIG. 4C. This figure illustrates the special processing required for this embodiment to preserve and present a consistent PDEV value to the operating system. Referring now to FIG. 4C, the internal state of the process is queried (Step CB) to determine if this is the first time this routine (DrvEnablePDEV) has been called. If it is the first time, then some initialization is required as illustrated in Steps CH, CI, and CJ. First, the local PDEV object is initialized (Step CH). This object will be used as the only value returned to the operating system 12 as a result of a call to DrvEnablePDEV, regardless of which display driver is currently selected. Next, DrvEnablePDEV calls are made to the original and alternate display drivers (Steps CI and CJ) to initialize them. Following the initialization sequence, the value of the internal switch variable is examined (Step CK) and the result, SWITCH or UNSWITCHED, is used to determine which driver values, alternate or original to set as the returned argument values for the call (Steps CG and CE respectively). The process uses the value of the local PDEV object to the operating system 12 (Step CL) for the actual return value of the call regardless of which set of driver values were returned in the call's argument list.

Referring again to Step CB, if this is not the first time a call has been made to the display driver interface manager 16 DrvEnablePDEV routine, initialization is assumed to have been previously done and the internal switch variable is examined (Step CC). If the value of the internal switch variable is UNSWITCHED, the call is forwarded to the original driver (Step CD), and the resulting argument values are set as the return argument values of the call (Step CE). On the other hand, if the value is SWITCHED, the call is forwarded to the alternate driver (CF) and its returned argument values are set as the return argument values for the call (CG). Regardless of which display driver was called, the local PDEV value is returned as the actual return value for the call.

FIG. 5 illustrates the operation of a switch control subsystem 22 and its relationship to the operation of a display driver interface manager 16 within the context of a Microsoft Windows/CE embodiment. The process executes in a continuous loop which is of interest beginning at step DA. In this step DA, the values of the input events are examined until a condition representing a request to switch to the alternative driver is detected. When this condition is detected, a series of steps, DB through DD, are executed which taken together cause the display driver interface manager to select the alternate display driver. In Step DB, a call to rotate the display to 0 degrees is issued, followed by setting the value of the shared global flag to SET (Step DC). Finally in this sequence of steps, a call to rotate the display to 90 degrees is issued (Step DD). It is important to first issue the call to rotate to 0 degrees since a call to rotate to 90 degrees, representing the salient signal to the display driver interface manager 16, may be ignored by the operating system 12 if it internally records that the current rotation orientation is already 90 degrees. Issuing the call to rotate to an orientation of 0 degrees guarantees that the operating system will not ignore the subsequent call to rotate to 90 degrees. After effecting the switch to the alternate display driver, the values of the input events are again examined, this time until a condition representing a request to switch to the original display driver is detected (Step DE). After detecting this condition, a sequence of steps is executed (Steps DF and DG), which taken together signal the display driver interface manager 16 to select the original display driver 18. First in the sequence is Step DF where the value of the shared global flag is set to a SET value. Following this, a call is issued to rotate the display to 0 degrees (Step DG). The combination of a value of SET for the shared global flag and the call to rotate to 0 degrees is interpreted by the display driver interface manager 16 to select the original display driver. The routine continues to Step DH where the value of the last valid rotation orientation for the original display is retrieved from the display driver interface manager. This value is used in step DI to set the original display to the orientation anticipated by the system 12. Following Step DI, the routine loops back to Step DA and begins the cycle again.

The invention has been explained with reference to specific embodiments. Other embodiments will be evident to those of ordinary skill in the art. It is therefore not intended that the invention be limited, except as indicated by the appended claims.

What is claimed is:

1. A method for dynamically switching display drivers of a mobile telephone or personal digital assistant device operative with a mobile device operating system with a graphics subsystem that is configured to communicate with a mobile device video driver, for display in an alternate format, the method comprising the steps of:

receiving video application program interface messages from said graphics subsystem into a display driver interface manager, said display driver interface manager displacing said mobile device video driver;

causing said display driver interface manager to select a video driver, while informing said mobile device operating system of a display type corresponding to said video driver and without causing said device to re-boot;

directing values of said video application program interface messages from said display driver interface manager to the video driver selected in the causing step; and enabling, via said display driver interface manager, the selected video driver to display a reconstructed image from said API messages.

2. The method according to claim 1 wherein said directing step includes presenting a consistent primary surface pointer to said mobile device operating system, said primary surface pointer containing information corresponding to surface information associated with said selected display video driver.

3. The method according to claim 1 wherein said directing step includes presenting a consistent instance identifying pointer to said mobile device operating system, said instance identifying pointer containing information corresponding to information associated with said selected display instance.

4. The method according to claim 1 wherein said causing step includes issuing from a switch control subsystem a set rotation command to said mobile device operating system, thereafter passing said set rotation command to said display device interface manager in a manner such that said display device interface manager interprets a value of said set rotation command as a display driver selector.

5. The method according to claim 4 wherein said manner is communicating a shared flag.

6. The method according to claim 1 wherein said causing step includes issuing a set rotation command from a switch control subsystem to force re-initialization of said graphics subsystem.

7. A system for alternating video output of a mobile telephone having a processing unit operative with a mobile operating system with a graphics subsystem that is configured to communicate with a mobile telephone video driver, for external display, the system comprising:

an alternative video driver operative through said processing unit, co-resident with said mobile operating system, and stored on one or more memories;

a display driver interface manager co-resident with said mobile operating system, including code for capturing application program interface messages (video API messages) from said graphics subsystem that are directed to said mobile telephone video driver into said display driver interface manager, and including code for directing values of said video API messages from said display driver interface manager to said alternate video driver without re-initialization of said mobile operating system; and code for displaying a reconstructed image based on said video API messages.

* * * * *